(12) United States Patent
Kim et al.

(10) Patent No.: US 6,839,121 B2
(45) Date of Patent: Jan. 4, 2005

(54) LIQUID CRYSTAL DISPLAY DEVICE FORMED ON GLASS SUBSTRATE HAVING IMPROVED EFFICIENCY

(75) Inventors: Jeong-Rok Kim, Gyeongsangbuk-Do (KR); Seung-Kyu Choi, Daegu (KR); Jun-Ho Chung, Gyeongsangbuk-Do (KR); Myung-Woo Nam, Gyeongsangbuk-Do (KR); Jae-Deuk Shin, Pusan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/317,176

(22) Filed: Dec. 12, 2002

(65) Prior Publication Data

US 2003/0122975 A1 Jul. 3, 2003

(30) Foreign Application Priority Data

Dec. 29, 2001 (KR) ................................ 10-2001-0088551

(51) Int. Cl.[7] ...................... G02F 1/1333; G02F 1/1345
(52) U.S. Cl. .......................... 349/152; 349/40; 324/770
(58) Field of Search ................... 349/40, 152; 324/770

(56) References Cited

U.S. PATENT DOCUMENTS

| 5,235,272 | A | * | 8/1993 | Henley ........................ 324/770 |
| 5,909,035 | A | * | 6/1999 | Kim ............................ 257/59 |
| 6,246,074 | B1 | * | 6/2001 | Kim et al. .................... 257/48 |
| 2003/0117536 | A1 | * | 6/2003 | Jeon ............................ 349/40 |

FOREIGN PATENT DOCUMENTS

| KR | 010026625 A | 4/2001 |
| KR | 10-0342860 B1 | 7/2002 |

* cited by examiner

Primary Examiner—Huyen Ngo
(74) Attorney, Agent, or Firm—Birch, Stewart, Kolasch & Birch, LLP

(57) ABSTRACT

An LCD device includes a displaying unit having a plurality of pixel areas defined by a plurality of gate lines and data lines disposed in longitudinal and transverse directions, a thin film transistor (TFT) formed in each of the pixel areas to be connected to a pixel electrode formed in the pixel area, and a gate pad and a data pad formed on ends of the corresponding gate line and data line; and a dummy region formed on an outer portion of the displaying unit, and including a gate shorting bar and a data shorting bar which are connected to the gate pads and the data pads to apply test signal(s) to the TFTs, wherein at least one of the gate shorting bar and the data shorting bar is a single shorting bar.

4 Claims, 4 Drawing Sheets

LIQUID CRYSTAL DISPLAY DEVICE FORMED ON GLASS SUBSTRATE HAVING IMPROVED EFFICIENCY

The present application claims the benefit of Korean Patent Application No. 2001-0088551 filed on Dec. 29, 2001, which is herein fully incorporated by reference.

BACKGROUND OF THE INVENTION

1. Field of the Invention

The present invention relates to a liquid crystal display device, and particularly, to a liquid crystal display device which improves the efficiency of a glass substrate by integrating shorting bars and thereby minimizing a margin of the liquid crystal panel formed on the glass substrate.

2. Description of the Background Art

A liquid crystal display (LCD) device is a transmittive flat panel display device, and is used in various electric devices such as mobile phones, PDAs and notebook computers. The LCD can be formed as a small, lightweight and power-efficient device, and can realize a high image quality. Therefore, the LCD has been researched and developed more than any other display devices. Moreover, as needs for digital TVs, high image quality TVs and wall mounted TVs increase, the LCD with a larger display area, which can be used in these TVs, is being researched actively.

Generally, LCDs can be divided into a few kinds according to the methods of operating liquid crystal molecules. However, an active matrix thin film transistor LCD is mainly used presently due to its rapid reaction speed and a minimal production of residual images.

FIG. 1 shows a structure of a general liquid crystal panel 1 in the above discussed TFT LCD. As shown therein, the liquid crystal panel 1 of the TFT LCD comprises a displaying unit 2 on which an image is realized. A plurality of gate lines 3 and data lines 5 defining a plurality of pixel areas are disposed in longitudinal and transverse directions on the displaying unit 2. A thin film transistor (TFT) 7, which is a switching device, is disposed in each of the pixel areas. Each TFT 7 is switched when a scan signal is input through the corresponding gate line 3 to pass a signal from the corresponding data line to the corresponding pixel electrode 9. Also, gate pads 12 and data pads 14 are formed on the ends of the gate lines 3 and data lines 5. Although it is not shown in FIG. 1, a gate driving IC and a data driving IC are mounted on the outer portions of the liquid crystal panel 1 to supply signals to the gate lines 3 and to the data lines 5 through the corresponding gate pads 12 and data pads 14.

Although it is not shown in FIG. 1 in detail, each thin film transistor 7 includes a gate electrode to which a scan signal is applied from the gate driving IC, and being connected to the corresponding gate line 3; a gate insulating layer formed on the gate electrode; a semiconductor layer formed on the gate insulating layer for forming a channel layer as the scan signal is applied to the gate electrode; and source/drain electrodes formed on the semiconductor layer for applying a signal to the pixel electrode 9. This signal is input through the corresponding data line 5 from the data driving IC as the channel layer is formed.

Generally, the liquid crystal panel includes an upper substrate and a lower substrate. The components described above, such as the gate lines, the data lines, the thin film transistors and pixel electrodes, are all formed on the lower substrate. A color filter for realizing colors is formed on the upper substrate. The upper substrate and the lower substrate are attached and a liquid crystal is injected therebetween to complete the liquid crystal display device.

In the structure of the LCD device constructed as above, the thin film transistor is a basic component for driving the LCD device. Therefore, after the thin film transistors are formed on the lower substrate, an inspection for identifying whether or not the thin film transistors are operated normally should be performed.

In order to inspect the operation of each thin film transistor, a test signal is applied to the corresponding gate electrode and to the corresponding source/drain electrodes, and then the voltage on the corresponding pixel electrode is measured. If there is a voltage change in the pixel electrode, it means that the test signal input through the source/drain electrodes was successfully applied to the pixel electrode and the thin film transistor is operating normally. If there is no voltage change in the pixel electrode, it indicates that an error or defect exists in the thin film transistor.

Generally, the test signal is input through the gate pad 12 and the data pad 14 formed on the ends of the gate line 3 and the data line 5. An additional wiring is needed to input the test signal.

Reference numerals 16 (16a, 16b) and 18 (18a, 18b) shown in FIG. 1 represent bars provided for inspecting the thin film transistors. These bars are also called as 'shorting bars'. These shorting bars 16 and 18 are formed on an outer portion of the displaying unit 2 in the liquid crystal panel 1, where this outer portion of the displaying unit 2 is generally called as a 'dummy region'.

As shown in FIG. 1, the shoring bars 16 and 18 formed in the dummy region can be divided into gate shorting bars 18a and 18b and data shorting bars 16a and 16b. The respective shoring bars are formed in pairs to be connected to respective odd gate pads 12 and odd data pads 14 and to be connected to respective even gate pads 12 and even data pads 14.

Also, the shorting bars 18a and 18b for the gates are connected to a gate test signal generating unit 20 to supply the gate test signals output from the gate test signal generating unit 20 to the gate lines 3. The shorting bars 16a and 16b for the data lines are connected to a data test signal generating unit 22 to supply the data test signals output from the data test signal generating unit 22 to the data lines 5.

Generally, a plurality of liquid crystal panels are fabricated altogether. That is, a plurality of liquid crystal panels are first fabricated on a single glass substrate of a large area. Then, this glass substrate is processed and cut into multiple sections to produce multiple liquid crystal panels. Therefore, the yield of an LCD device is dependent on how many liquid crystal panels can be fabricated on a single glass substrate (that is, how efficiently the glass substrate is used).

FIG. 2 shows an example of a glass substrate 30 on which a plurality of liquid crystal panels (for example, 6 panels) are formed. As shown therein, six liquid crystal panels 1 are provided. Each liquid crystal panel 1 comprises a displaying unit 2 on which an image is realized and a dummy region 4 in which the shorting bars 16 and 18 are formed. In this environment, it is difficult to reduce the size of the displaying unit 2 having a fixed number of pixels since it requires fine pitch technology.

Therefore, in order to improve the efficiency of the glass substrate, it is desirable that the size of the dummy regions 4 of the liquid crystal panels 1 is reduced. However, in the general LCD device, since the gate shorting bars 18a and 18b and the data shorting bars 16a and 16b are formed in pairs, it is very difficult to reduce the size of the dummy regions (that is, the margin of the liquid crystal panel).

SUMMARY OF THE INVENTION

Therefore, an object of the present invention is to provide a liquid crystal display device in which the margin of a liquid crystal panel is minimized by forming at least one of a gate shorting bar and a data shorting bar using a single line or bar, to maximize the efficiency of a glass substrate on which the liquid crystal panel is formed.

Another object of the present invention is to provide a liquid crystal display device and technique that overcomes problems and disadvantages of the background art LCD devices.

To achieve the objects of the present invention, as embodied and broadly described herein, there is provided a display device comprising: a plurality of pixel areas defined by a plurality of gate lines and a plurality of data lines, and including a thin film transistor formed in each of the pixel areas; a plurality of gate pads coupled to the gate lines in an outer portion of the display device; a plurality of data pads coupled to the data lines in the outer portion of the display device; and a dummy region disposed in the outer portion of the displaying device, and including a gate shorting bar and a data shorting bar which are connected to the gate pads and the data pads, respectively, to apply at least one test signal to the thin film transistors, wherein at least one of the gate shorting bar and the data shorting bar is a single shorting bar.

A test signal generating unit is connected respectively to the gate shorting bar and the data shorting bar to apply the test signal to the shorting bars. Each of the gate shorting bar and the data shorting bar may be formed using a single line or bar. In another example, the gate shorting bar may be formed using a single line and the data shorting bar may be formed using two lines. In another example, the data shorting bar may be formed using a single line and the gate shorting bar may be formed using two lines.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, the efficiency of a glass substrate, on which liquid crystal panels are formed, is increased to improve the fabrication yield of the liquid crystal display (LCD) devices. For this purpose, the margin of each of the liquid crystal panels on the glass substrate is minimized to produce a maximum number of liquid crystal panels on a single glass substrate. The margin of the liquid crystal panel can be minimized by reducing a dummy region on which shorting bars are formed, since it is generally difficult and undesirable to reduce the size of the displaying unit on which pixels are formed.

Conventionally, a gate shorting bar is formed in pairs and a data shorting bar is formed in pairs. These shorting bars apply test signals alternately to the respective gate line and the respective data line. However, in the present invention, the gate shorting bar and/or the data shorting bar is formed to be of a single bar. This reduces the area size of the dummy region on which the shorting bars are formed, and thereby minimizes the margin of the liquid crystal panel. Therefore, the size of the area occupied by a single liquid crystal panel on the glass substrate is reduced and, consequently, the entire glass substrate can be used more efficiently to produce a maximum number of liquid crystal panels. In one example, Mo/AlNd having low resistance is used as the shorting bars.

Hereinafter, the LCD device according to the embodiments of the present invention will be described in detail with reference to FIGS. 3A–4.

Figure 3A:
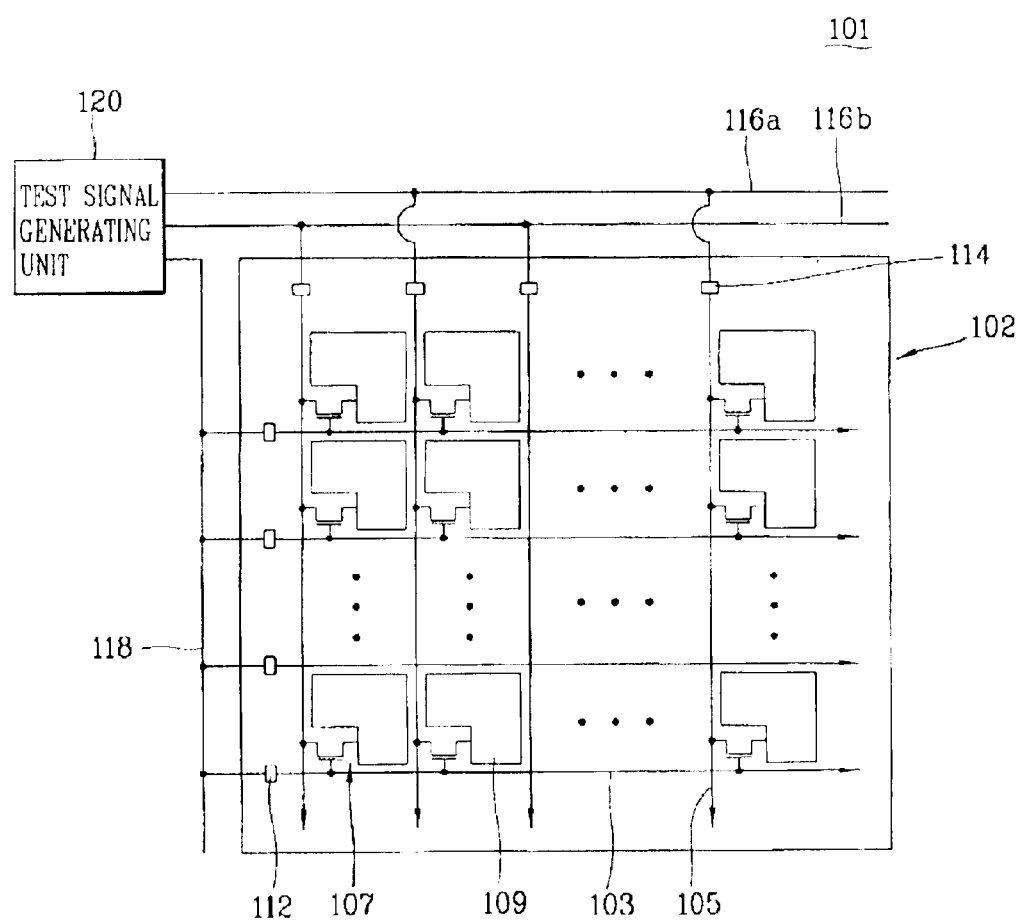
FIG. 3A is a view showing a structure of an LCD device according to one embodiment of the present invention.

FIG. 3A is a view showing an LCD device according to one embodiment of the present invention. As shown therein, a displaying unit 102 of a liquid crystal panel 101 includes a plurality of pixel areas defined by a plurality of gate lines 103 and data lines 105. Thin film transistors (TFTs) 107 connected to the gate lines 103 and the data lines 105 are formed in respective pixel areas. A gate pad 112 and a data pad 114 are formed on ends of each gate line 103 and each data line 105. Accordingly, a channel layer is formed in the respective thin film transistor as a scan signal is applied through the corresponding gate pad 112 from a gate driving IC (not shown). A data signal is also applied from a data driving IC (not shown) to the corresponding pixel electrode 109 formed in the pixel area, through the data pad 114 and source/drain electrodes of the TFT.

A single gate shorting bar 118 for all the gate lines 103 and a pair of data shorting bars 116a and 116b for all the data lines 105 are connected to the gate pads 112 and the data pads 114, respectively. Here, the gate shorting bar 118 is connected to all the gate pads 112, whereas a first data shorting bar 116a is connected to odd data pads 114 and a second data shorting bar 116b is connected to even data pads 114.

The gate shorting bar 118 and the data shorting bars 116a and 116b are all connected to a test signal generating unit 120. When the test signal generating unit 120 generate and outputs at least one gate test signal to the gate shorting bar 118, this gate test signal is applied to the gate electrodes of the thin film transistors 107 through the respective gate pads 112. On the other hand, when the test signal generating unit 120 generates and outputs at least one data test signal to each of the data shorting bars 116a and 116b, the data test signals are passed through the respective data pads 114 and the source/drain electrodes of the thin film transistors 107 and applied to the pixel electrodes 109 appropriately.

A voltage difference generated in a pixel electrode due to the applied gate/data test signal is detected using a sensor for detecting such a voltage such as a potential sensor. As a result, an error or defect in each thin film transistor can be inspected effectively.

In one embodiment, the data shorting bars 116a and 116b are made of, e.g., metal Cr, which may be the same material used to form source/drain electrodes. The gate shorting bar 118 is mainly made of, e.g., Mo/AlNd; however, other metals may be used. The Mo/AlNd has a lower resistance than Cr, and therefore, the generation of a signal delay caused by a resistance difference on the entire liquid crystal panel is prevented.

As described above, the area occupied by the gate shorting bar 118 can be reduced significantly by forming only one gate shorting bar 18 as compared to the multiple gate shorting bars. Consequently, the size of the liquid crystal panel 101 can be reduced. In strictly speaking, the reduced area of the liquid crystal 101 is caused not by reducing the area of the displaying unit 102 of the panel 101, but by reducing the size of the dummy region in which the shorting bars are formed. Since the margin of the liquid crystal panel can be reduced by reducing the dummy region size, a greater number of liquid crystal panels or larger liquid crystal panels can be formed on a single glass substrate to improve the yield of the LCD devices.

Figure 3B:
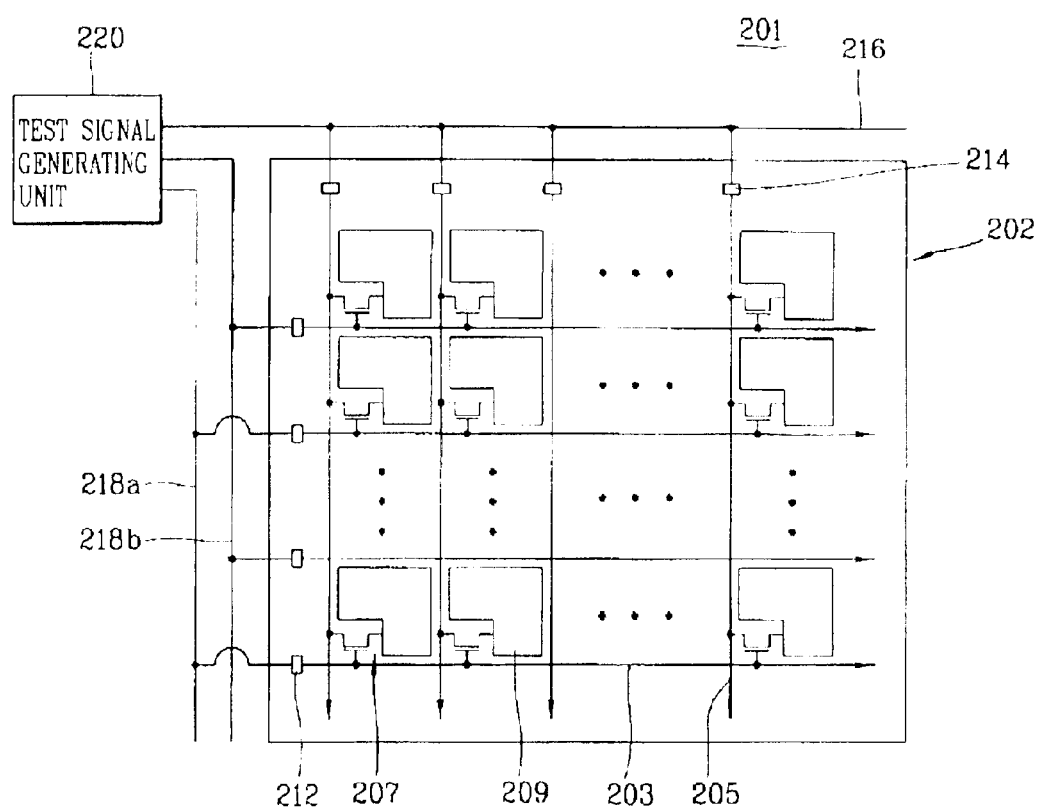
FIG. 3B is a view showing a structure of an LCD device according to another embodiment of the present invention.

FIG. 3B is a view of an LCD device including a liquid crystal panel 201 with a displaying unit 202 according to another embodiment of the present invention. In this embodiment, the LCD device includes a single data shorting bar 216 and a pair of gate shorting bars 218a and 218b. As shown in FIG. 3B, the gate shorting bars 218a and 218b apply the gate test signal(s) to the gate lines 203 in odd numbers and even numbers alternately. In this case, the two gate shorting bars 218a and 218b and the data shorting bar 216 are all connected to the test signal generating unit 220. The test signal generating unit 220 generates and outputs corresponding test signals to the shorting bars 216, 218a and 218b coupled to gate pads 212, data pads 214 and pixel electrodes 209.

In this embodiment, the gate shorting bars 218a and 218b are mainly made of, e.g., Cr, and the data shorting bar 216 is made of, e.g., Mo/AlNd. However, other metals may be used.

Figure 3C:
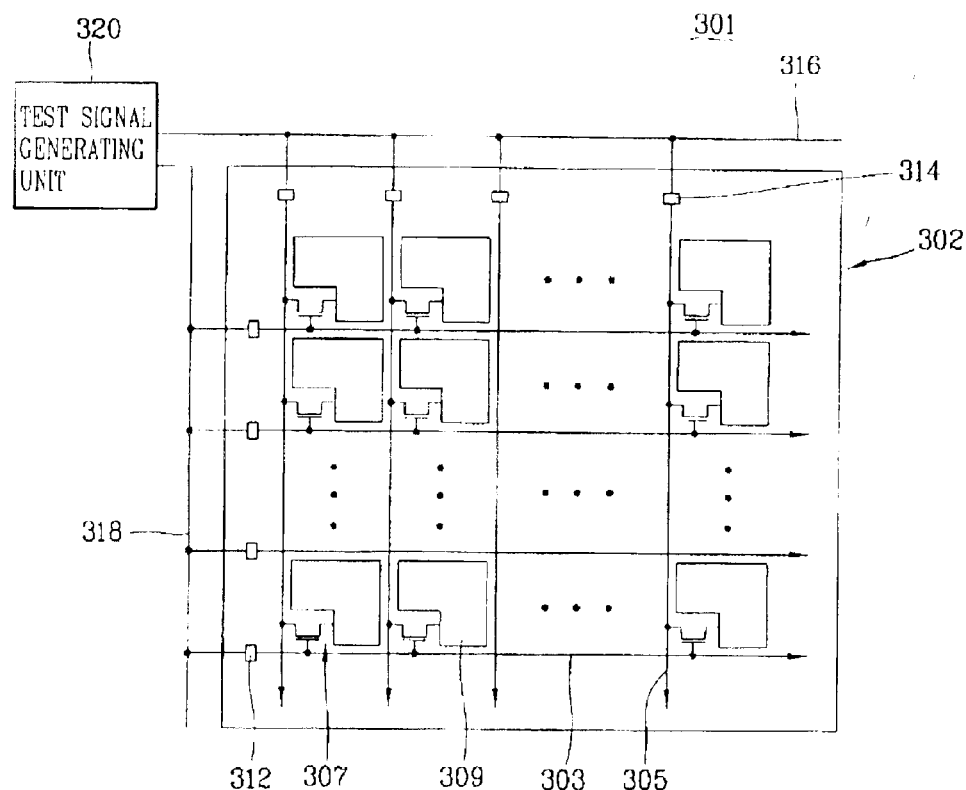
FIG. 3C is a view showing a structure of an LCD device according to still another embodiment of the present invention.

FIG. 3C is a view of an LCD device including a liquid crystal panel 301 with a displaying unit 302 and pixel electrodes 309 according to another embodiment of the present invention. In this embodiment, a single gate shorting bar 318 and a single data shorting bar 316 are provided in the liquid crystal panel 301. As shown in FIG. 3C, the gate shorting bar 318 is connected to each of gate pads 312, and the data shorting bar 316 is connected to each of data pads 314. Therefore, the size of the dummy region of the liquid crystal panel 301, on which the gate shorting bar 318 and the data shorting bar 316 are formed, can be reduced further, so that the margin of the liquid crystal panel can be reduced. In this embodiment, the gate shorting bar 318 and the data shorting bar 316 are made of, e.g., Mo/AlNd; however, other metals may be used.

Figure 1:
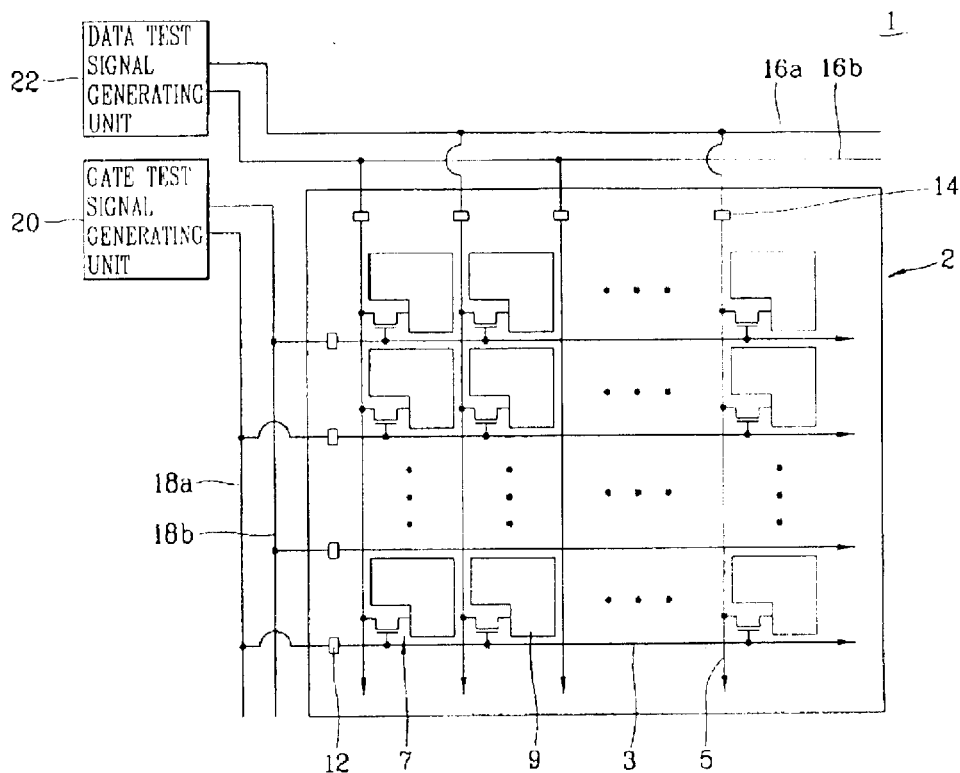
FIG. 1 is a plane view showing a structure of a general liquid crystal display (LCD) device.
Figure 2:
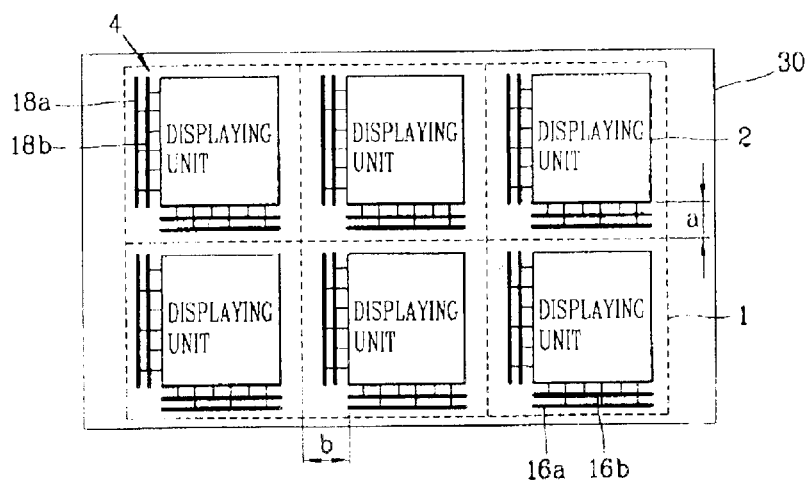
FIG. 2 is a view showing a general glass substrate on which a plurality of liquid crystal panels are formed.
Figure 4:
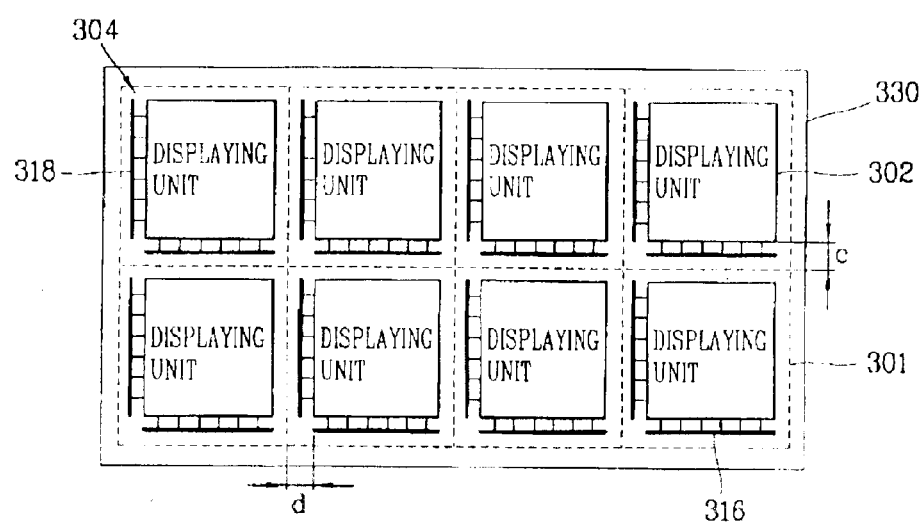
FIG. 4 is a view showing an example of liquid crystal panels fabricated on a glass substrate according to an embodiment of the present invention.

FIG. 4 shows an example of a glass substrate on which a plurality of liquid crystal panels constructed as above are formed according to an embodiment of the present invention. The formation of multiple liquid crystal panels on a single glass substrate will be described as taking an example of the liquid crystal panel shown in FIG. 3C. As shown in FIG. 4, a plurality of liquid crystal panels 301 are formed on a glass substrate 330. Each of the liquid crystal panels 301 comprises a displaying unit 302 on which pixels are formed and a dummy region 304 in which the shorting bars 316 and 318 are formed. In this example, the gate shorting bar 318 and the data shorting bar 316 are formed in the dummy region as single bars, respectively. Therefore, the size of the dummy region can be reduced significantly as compared to the general dummy region shown in FIG. 2. That is, the liquid crystal panel shown in FIG. 2 has a dummy region with the lengths of 'a' and 'b'. However, each liquid crystal panel shown in FIG. 4 has a dummy region with the lengths of 'c' and 'd', which are shorter than 'a' and 'b', respectively. Therefore, the margin of each liquid crystal display device is reduced as much as the difference a–c and b–d, respectively.

In this manner, an extra space is created on the glass substrate 330 as much as the reduced margin. Thus, a greater number of liquid crystal panels or larger liquid crystal panels can be formed on the glass substrate 330. This maximizes the usage efficiency of the glass substrate.

As described above, according to the present invention, the gate shorting bar and/or the data shorting bar formed in the dummy region of the liquid crystal panel and used to inspect the thin film transistors is made as a single bar respectively using Mo/AlNd having low resistance. Thus, the margin of the liquid crystal panel can be minimized. Further, a greater number of liquid crystal panels or larger liquid crystal panels can be formed on a single glass substrate and thus, the usage efficiency of the glass substrate can be improved greatly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display (LCD) intermediate device comprising:
    a displaying unit including,
        a plurality of pixel areas defined by a plurality of gate lines and a plurality of data lines,
        a thin film transistor formed in each of the pixel areas and to be connected to a pixel electrode formed in that pixel area, and
        at least one gate pad and at least one data pad formed on ends of the corresponding gate line and data line, and
    a dummy region disposed in an outer portion of the displaying unit, and including a gate shorting bar and a data shorting bar which are connected to the gate pads and the data pads, respectively, to apply at least one test signal to the thin film transistors,
    wherein the gate shorting bar is a single bar connected to the gate pads, and the data shorting bar includes a first data shorting bar which connected to odd data pads and a second data shorting bar connected to even data pads; and
    wherein the first and second data shorting bars are made of Cr, and the gate shorting bar is made of Mo/AlNd.

2. A display intermediate device comprising:
    a plurality of pixel areas defined by a plurality of gate lines and a plurality of data lines, and including a thin film transistor formed in each of the pixel areas;
    a plurality of gate pads coupled to the gate lines in an outer portion of the display device;
    a plurality of data pads coupled to the data lines in the outer portion of the display device; and a dummy region disposed in the outer portion of the displaying device, and including a gate shorting bar and a data shorting bar which are connected to the gate pads and the data pads, respectively, to apply at least one test signal to the thin film transistors, wherein the gate shorting bar is a single bar connected to the gate pads, and the data shorting bar includes a first data shorting bar connected to odd data pads and a second data shorting bar connected to even data pads, and wherein the first and second data shorting bars are made of Cr, and the gate shorting bar is made of Mo/AlNd.

3. A method of fabricating a liquid crystal display device, the method comprising the steps of:

providing a liquid crystal display panel, the liquid crystal display panel including a displaying unit and dummy region, the display unit including,
 a plurality of pixel areas defined by a plurality of gate lines and a plurality of data lines,
 a thin film transistor formed in each of the pixel areas and to be connected to a pixel electrode formed in that pixel area, and
 at least one gate pad and at least one data pad formed on ends of the corresponding gate line and data line; and the dummy region being disposed in an outer portion of the displaying unit, and including at least one of a gate shorting bar and a data shorting bar which are connected to the gate pads and the data pads, wherein the gate shorting bar is a single bar connected to the gate pads, and the data shorting bar includes a first data shorting bar connected to odd data pads and a second data shorting bar connected to even data pads, and wherein the first and second data shorting bars are made of Cr, and the gate shorting bar is made of Mo/AlNd, applying a test signal to at least one of the gate shorting bar and the data shorting bar to test the thin film transistor; and processing the liquid crystal display panel.

4. A method of fabricating a liquid crystal display device, the method comprising the steps of:

providing first and second substrates;

forming at least one liquid crystal display panel in the substrates, the liquid crystal display panel including a displaying unit and a dummy region, the display unit including,
 a plurality of pixel areas defined by a plurality of gate lines and a plurality of data lines,
 a thin film transistor formed in each of the pixel areas and to be connected to a pixel electrode formed in that pixel area, and
 at least one gate pad and at least one data pad formed on ends of the corresponding gate line and data line; and the dummy region being disposed in an outer portion of the displaying unit, and including at least one of a gate shorting bar and a data shorting bar which are connected to gate pads and the data pads, wherein the gate shorting bar is a single bar connected to the gate pads, and the data shorting bar includes a first data shorting bar connected to odd data pads and a second data shorting bar connected to even data pads; and wherein the first and second data shorting bars are made of Cr, and the gate shorting bar is made of Mo/AlNd.

applying a test signal to at least one of the gate shorting bar and the data shorting bar to test the thin film transistors; and processing the substrates to separate liquid crystal display panel from the substrates.

* * * * *